Patented Sept. 26, 1939

2,174,365

UNITED STATES PATENT OFFICE 2,174,365

BLENDING EDIBLE FATS

Arne Gudheim, Leonia, N. J., assignor to Lever Brothers Company, a corporation of Maine No Drawing. Application October 30, 1937, Serial No. 171,909

4 Claims. (Cl. 99—122)

This invention relates to a plastic edible shortening and the method of manufacturing the same.

More particularly, the invention relates to a plastic shortening having a wide plastic range so that the shortening possesses not only the desired consistency or hardness at room temperature but also retains a suitable consistency at temperatures considerably below and above room temperature.

It is an object of my invention to produce a plastic edible shortening having improved culinary properties and having a wider plastic range than that possessed by shortenings heretofore available.

It is also an object of my invention to produce a shortening containing a smaller quantity of hard fat than that heretofore used whereby economy in manufacture is obtained in addition to improved plastic properties.

In the manufacture of shortenings of the type to which my invention relates, it is customary to refine oils, hydrogenate all or a portion of them to increase their consistency, and otherwise treat them in a conventional manner. During these steps, the oils or fats are maintained in a liquid state. At a suitable point in the process, oils and fats having different characteristics are mixed or blended to yield a final product having the desired characteristics. The liquid mixture is then chilled to a semi-solid plastic state and air or an inert gas is beaten into the plastic shortening giving it a white appearance and a "creamy" smooth texture.

In addition to the materials above mentioned, naturally occurring plastic fats, such as lard, may also be used in manufacturing a shortening.

In order to better understand the significance of the plasticity or consistency of a shortening it is well to consider the effect of shortening in a baked product. The action of shortening is physical rather than chemical, and therefore its physical properties are particularly important.

Flour is composed of 70-75% starch in the form of granules which remain as solid particles throughout the process of mixing and baking. The proteins contained in flour are principally glutenin and gliadin, both of which absorb water. The gliadin forms a glue-like mass with water which comes in contact with the firmer particles of glutenin during the mixing and forms the gluten of the dough. The gluten exists as strands and layers throughout the dough mass and as the mixing is continued the strands of gluten come in contact with each other and stick together. In this way the gluten develops and becomes stronger and more coherent. The network of gluten forms the skeleton of dough and in this network the starch granules are held. If such a dough were baked without shortening, a hard, strong product would be produced which could not be easily broken or crushed.

From this consideration, the fundamental action of shortening can be more easily understood. On mixing a shortening of proper consistency with the dough, the shortening becomes mingled very intimately with other ingredients although it remains distinct and does not dissolve. During the mixing the shortening spreads and coats fresh surfaces in the dough with the result that when a fiber of gluten tends to come in contact with another fiber of gluten, the intermediate film of shortening prevents these two fibers from cohering as intimately as they otherwise would. In a like manner the shortening also penetrates between the starch granules. The shortening, therefore, breaks up what otherwise would be a continuous mass in the dough and performs the function of a separator or lubricant for the constituents of the dough. As a result, the various flour particles which are covered with the shortening do not adhere tenaciously to each other at their points of contact because of the shortening, and hence the product tends to crumble or break and in this condition it is known as being "tender" or "short".

It is well known that some shortenings have a much greater "shortening power" per pound than others. This is due to a number of features, some of which are not fully understood inasmuch as dough is a very complex mixture of colloids partially in colloidal solution and partially in suspension, and the introduction of a shortening into dough brings about complicated changes in the structure.

One of the most important properties of a shortening is its plasticity, smoothness and fineness throughout the mixing. If the shortening is liquid or too soft it may be absorbed to a considerable extent by the starch granules and as a result the dough will be "soggy"; or it may separate from the dough and collect in small, isolated pools with the result that the distribution of the shortening throughout the dough will not be uniform. A shortening also should not be too hard or non-plastic because if it is it will not coat or completely envelope each of the starch granules and spread uniformly and intimately throughout the dough mass. A shortening which is too hard or non-plastic will not cover as great an area in the dough as a more plastic shortening and will not properly fill the cracks, pores and spaces in the dough.

It will be seen, therefore, that a shortening which remains plastic throughout the mixing will have a much greater "shortening power" than one which is either too solid or too liquid.

The desired degree of plasticity is generally achieved by forming the shortening from a mixture of oils and fatty compounds having different melting points. Some of the constituents are solid at room temperature, others may be said to be in a semi-solid condition, and still others are liquids at room temperature. The solid fat in the shortening forms a matrix or crystalline structure throughout which the liquid and the softer portions are uniformly and finely distributed. This gives the shortening the appearance of a uniform continuous mass. The liquid oils, when distributed in this condition, impart the necessary plasticity to the shortening but are, nevertheless, so held in the matrix that they are not available in a free form to deleteriously affect the culinary properties of the shortening. The consistency or hardness of a shortening at any particular temperature and the temperature range over which a suitable consistency will be maintained, is largely dependent upon the relative proportions and melting points of the different fats present. As the temperature of a shortening is raised or lowered the ratio of solid to liquid constituents changes. Consequently the plasticity of the shortening is also dependent to some extent upon the temperature.

Plastic shortenings may be divided into two general types; the first is composed primarily of plastic fat, such as partially hydrogenated edible oil, lard or lard compounds, to which is added a small percentage of a relatively hard fat; the second general type is the so-called compound type which is made from an edible unhydrogenated liquid oil blended with a sufficient portion of solid fats to give a final semi-solid product of desired placticity. My invention is applicable to either of these types of shortenings.

It is desirable in manufacturing shortening to employ those oils and fats, and in such proportions, as to form a product having the desired consistency and hardness at room temperature. It is also desirable that the shortening should retain its plastic or hard characteristics at relatively high temperatures, for example it is not unusual, particularly in the summer season and in hot kitchens, for shortening to be subjected to temperatures as high as 95° F. or higher. Unless the constituents of the shortening are properly proportioned it will become soft and oily at such relatively high temperatures, and the liquid constituents and the occluded gas will be released thereby adversely affecting the culinary properties of the shortening as well as its appearance.

Similarly, shortenings are often kept or stored in refrigerators or otherwise subjected to low temperatures. If the shortening is not reasonably plastic at these temperatures, it will be difficult to mix with the other ingredients in the making of a culinary product. In order to avoid this difficulty it is often heated too quickly which deleteriously affects its culinary properties.

In addition, the keeping quality of a shortening is influenced by its physical stability and for this reason it is desirable that the shortening should remain firm and plastic throughout the temperature variations to which the shortening is apt to be subjected before usage.

From the above considerations it will be seen that the shortening should not only have the proper plasticity at room temperature but that it also should retain the desired plasticity as much as is possible over a wide temperature range. In manufacturing shortenings, therefore, the components should be selected and proportioned so as to impart a plastic consistency to the shortening at room temperature and the maximum firmness at elevated temperatures, while at the same time the constituents should also be selected and proportioned such that the shortening will not become hard or brittle when subjected to low temperatures.

In accordance with the prior practice, plastic shortenings are made from partially hydrogenated vegetable oil such as cottonseed oil, corn oil, peanut oil, etc., or an unhydrogenated oil of similar type, to which has been added various percentages of a hard fat having a titer of about 50° C. It is the common practice to make this hard fat by hydrogenating vegetable oil to this titer. This hard fat forms the principal crystalline structure or matrix in the shortening throughout which the softer and liquid fats and oils are distributed.

Hard fats having a titer of about 50° C. when added to the softer constituents increase the hardness of the shortening at lower temperatures to a greater extent and in a much greater proportion than they do at higher temperatures. Consequently, when a sufficient quantity of this hard fat is added to produce a plastic product at the high temperatures, the shortening becomes too hard at room temperatures and brittle and very hard at lower temperatures. This can be overcome to a limited extent by employing a greater proportion of the liquid and very soft constituents. However, in doing this, the degree of unsaturation is increased and the resistance to rancidity is reduced.

I have discovered that if a harder fat than that employed heretofore, is added to the shortening, for example, a fat having a titer of substantially 65° C. or higher, the hardness of the shortening at elevated temperatures is materially increased as compared with shortenings made in accordance with the prior practice; the hardness of the shortening at lower temperatures also is decreased or at least there is no increase in hardness at lower temperatures. In other words, the plastic range of the shortening is extended beyond that heretofore known.

The amount of the hard fat that is employed will depend upon the desired plastic characteristics of the shortening, and the culinary uses to which the shortening is to be put. It will also depend upon the characteristics and the relative proportions of the softer and liquid constituents. The amount of the hard fat will usually be small, and in most instances, will vary from about .5 to 5%, in the case of partially hydrogenated shortenings, and up to 10% in the compound type of shortening. My invention, however, includes products having higher percentages of hard fat, which may be used in the preparation of shortenings for special culinary purposes.

Hard fats having a titer of substantially 65° C. or higher, may be conveniently prepared by fully hydrogenating suitable vegetable oils. When the oil is fully hydrogenated, the degree of unsaturation is relatively very low, as is revealed by its iodine value. For example, soya bean oil hydrogenated to an iodine value of about 5 has a titer of 65° C., and at an iodine value of about 1.0 it has a titer of about 66.2° C. Sunflower oil, hydrogenated to an iodine value of about 1.0, has a titer of about 65° C. Sesame oil, hydrogenated to an iodine value of 1 has a titer of 66.5° C.

Not all oils may be hydrogenated to a titer of 65° C. and some oils cannot be hydrogenated to a titer of 60° C. Cottonseed oil, hydrogenated to an iodine value of 1.0, has a titer of about 62° C. and cannot be hydrogenated to a titer higher than about 63° C.

In general, the iodine value of the hard fat I employ is below 3. While this is preferable, it is not necessary because the iodine value is not critical as long as the titer is 65° C. or above. For example, linseed oil, when hydrogenated to an iodine value about 10, will have a titer of 65° C.

By "completely hydrogenating" I refer to the hydrogenation of oil to the extent ordinarily obtained in commercial operations, and in which the iodine value of the hardened fat is between 0 and 3.

In determining the plasticity or consistency of a fat at room temperature or any other given temperature, a penetration test is employed which indicates in arbitrary values the extent to which a plunger needle of definite dimensions and weight will penetrate the fat under given conditions.

The meaning of the term penetration as used herein is similar to the meaning of this term as commonly employed in the commercial examination of plastic bituminous materials. The term penetration as relating to bituminous materials is defined in the fourth edition of "Standard Methods of Chemical Analysis" by Scott as follows: "Penetration is defined as the consistency of a bituminous material expressed as the distance that a standard needle vertically penetrates a sample of the material under known conditions of loading, time and temperature." The size of the needle, the conditions of loading, time and temperature employed in a shortening test are arbitrarily determined and are constant for all tests.

As illustrative of the prior art, a conventional partially hydrogenated base prepared by partially hydrogenating cottonseed or any other oil commonly used as a base for the partially hydrogenated type of plastic shortenings, has added thereto a hard fat having a titer of 50° C. in an amount that will produce a desired plasticity at room temperature. If about 4% of the 50° C. titer fat is added to the base, the penetrations of this shortening at 43° F. and 90° F., are about 59 and 410, respectively.

In accordance with my invention, a shortening is prepared from the same partially hydrogenated base to which has been added about 1% of a hard fat having a titer of 65° C. has about the same penetration at room temperature (70° F.), but has penetrations of about 65 and 345 at the same lower and upper temperatures, respectively. It will be seen, therefore, that the shortening containing the hard fat having a titer of 65° C. has a greater penetration value at the lower temperatures, i. e., is about 10% softer; and has a lower penetration value at the higher temperatures, i. e., is about 19% harder, than the shortening containing the hard fat having a titer of 50° C.

It will also be noted that in the case of the hard fat having the higher titer the amount required is much less than in the case of the fat having a titer of about 50° C. In the above illustrations, for example, the amount of hard 50° C. titer fat required is four times the amount of the 65° C. titer fat required to produce a shortening having the same penetration at room temperature. Inasmuch as the production of a hard fat is more expensive than the partially hydrogenated base, the economic advantages of my invention are immediately apparent.

As an additional example of the manner in which the plastic range may be extended by the use of the hard fat described, a shortening may be prepared in accordance with my invention by employing the same partially hydrogenated base to which is added about 1.5% of a hard fat having a titer of about 65° C. This shortening will have a congealing point of about 31° C. and at room temperature (70° F.) will have a penetration of about 188. At a temperature of 87° F. the shortening will have a penetration of about 275. If a shortening is prepared from the same partially hydrogenated base and with a hard fat having a titer of about 50° C., it is necessary to add about 10% of this hard fat in order to obtain a shortening having the same congealing point and the same plasticity and stability at the elevated temperature. However, in such a shortening, the penetration at room temperature will be only about 145, which is too low for an acceptable product.

It will be noted that the shortening made with the 65° C. titer hard fat is more penetrable at the lower temperatures and much less penetrable at the higher temperatures than shortenings prepared by using the 50° C. titer fat. The plastic characteristics so essential in shortenings are, therefore, retained to a much greater extent over a wide temperature range.

The unobvious advantages of my invention may also be demonstrated by forming shortenings composed of a somewhat softer, partially hydrogenated base stock, to separate quantities of which is added relatively larger percentages of hard fats having titers of about 50° C. and 66° C., respectively.

If 7% of the 50° C. titer fat is added to this softer base stock, the penetration at about 81° F. is above 450 and the penetrations at 84° F. and 86° F. are too great to measure.

If a shortening is prepared from the same softer base stock to which is added about 3.5% of a hard fat having a titer of 66° C., the shortening will have about the same penetration at room temperature, but will have a penetration of only about 347 at 81° F., 392 at 84° F., and about 415 at 86° F.

In the above shortening containing the 66° C. titer fat, the penetration at lower temperatures, for example at 43° F., is no greater than that of the shortening containing 7% of the 50° titer fat.

It will be seen, therefore, that the use of the harder fat in these instances also is productive of a shortening that is much harder and more stable at higher temperatures without in any way altering the plasticity at room temperatures or at relatively low temperatures.

In order to better understand and appreciate the plasticity advantages to be gained by employing a hard fat having a high titer in admixture with the softer oleaginous materials and to interpret the penetration in terms which are more commonly understood, the penetration figures obtained on commercial samples of butter and lard at 43° F., 50° F. (the temperature usually encountered in a household ice box), 70°

F. (room temperature), 81.5° F., and 87° F. (the temperatures to which a shortening is likely to be exposed in a kitchen in the summer months), are shown below:

| Sample | 43° F. | 50° F. | 70° F. | 81.5° F. | 87° F. |
|---|---|---|---|---|---|
| Butter | 80-90 | 130-140 | 275-285 | Higher than 500. | Too soft to measure. |
| Lard | 145-155 | 175-185 | 245-255 | ...do... | Do. |

These results were obtained in the same manner as were the figures on the samples which are referred to above.

As has been pointed out heretofore, satisfactory culinary results can be secured from a shortening only when it has the proper plasticity at the temperature at which it is being used, and that shortenings containing the hard fats of 65° C. titer or above are plastic over a wider temperature range than those heretofore known to the art. As a consequence better culinary results can be obtained over a much wider temperature range using shortenings containing hard fats of 65° C. titer or above than can be obtained with those compounded with hard fats of a lower titer as previously known in the art.

It is important for a shortening to cream rapidly for the reason that only a minimum effort, and a short beating period, are required to obtain the optimum culinary results from the shortening. A shortening that has a low initial creaming action requires considerably more working and a longer period of beating to obtain satisfactory results than does a shortening having a high or good initial creaming action.

The initial creaming action of several shortenings compounded with different amounts of the same hard fat is largely dependent on the concentration of hard fat contained in the shortening; the higher the concentration of hard fat used, the slower the initial creaming action. Since, in general, the lower the concentration of hard fat used in a shortening the higher the initial creaming, and since considerably less hard fat is required in a shortening when a hard fat of 65° C. titer or above is used, it follows that shortenings which have superior initial creaming abilities can be secured by the use of 65° C. or above titer hard fat than can be obtained with the use of a hard fat of lower titer as is common in the art.

It will be apparent that many modifications of my invention other than those heretofore set forth, may be practised without departing from the invention, and I intend all such equivalent modifications and variations to be included in my invention as set forth in my claims.

I claim:

1. A plastic, aerated shortening having a uniform appearance and texture comprising a base of partially hydrogenated vegetable oil that is semi-solid but somewhat softer than that desired at room temperature, with which is mixed .5 to 5% of a hard fat having a titer of not less than 65° C., said hard fat being prepared by hydrogenating a vegetable oil which, when completely hydrogenated, has a titer of not less than 65° C., whereby the mixture has a plasticity at room temperature suiting it for culinary operations, and retains its plasticity over a wide temperature range.

2. A plastic shortening having a uniform appearance and texture comprising oils and fats of different melting points proportioned to impart plasticity to the entire mixture suiting it for culinary operations at room temperature, said mixture including .5 to 5% of a hard fat having a titer of not less than 65° C., said hard fat being prepared by hydrogenating a vegetable oil which, when completely hydrogenated, has a titer of not less than 65° C., whereby said shortening retains its plastic characteristics over a wide temperature range.

3. A plastic shortening having an inert gas included therein and having a uniform appearance and texture comprising a base of partially hydrogenated vegetable oil that is semi-solid but somewhat softer than that desired at room temperature, with which is mixed .5 to 5% of a hard fat having a titer of not less than 65° C., said hard fat being prepared by hydrogenating a vegetable oil which, when completely hydrogenated, has a titer of not less than 65° C., whereby the mixture has a plasticity at room temperature suiting it for culinary operations, and retains its plasticity over a wide temperature range.

4. A plastic shortening having a uniform appearance and texture comprising oils and fats of different melting points proportioned to impart plasticity to the entire mixture suiting it for culinary operations at room temperature, said mixture including .5 to 5% of a hard fat having a titer of not less than 65° C., whereby said shortening retains its plastic characteristics over a wide temperature range.

ARNE GUDHEIM.